United States Patent [19]

Renard

[11] Patent Number: 5,192,137

[45] Date of Patent: Mar. 9, 1993

[54] FLEXIBLE PLAIN BEARING AND ITS APPLICATION TO MOTOR VEHICLE STEERING MECHANISMS

[75] Inventor: Henri J. A. Renard, Seloncourt, France

[73] Assignee: ECIA, France

[21] Appl. No.: 795,388

[22] Filed: Nov. 21, 1991

[30] Foreign Application Priority Data

Nov. 28, 1990 [FR] France ........................ 90 14891

[51] Int. Cl.$^5$ .................. F16C 17/10; F16C 23/04
[52] U.S. Cl. ........................ 384/275; 384/192; 384/296
[58] Field of Search .......... 384/192, 215, 223, 220, 384/275, 295–297, 202, 203

[56] References Cited

U.S. PATENT DOCUMENTS

| 3,604,765 | 9/1971 | Babcock | 384/192 |
| 4,415,166 | 11/1983 | Beia | 277/51 |
| 4,603,982 | 8/1986 | Dittrich | 384/129 |
| 4,756,249 | 7/1988 | Hardin | 384/215 X |
| 4,854,745 | 8/1989 | Kamimura et al. | 384/420 |

FOREIGN PATENT DOCUMENTS

| 1297406 | 5/1962 | France | 384/220 |
| 2537674 | 6/1984 | France | |
| 2004956 | 4/1979 | United Kingdom | |

*Primary Examiner*—Thomas R. Hannon
*Attorney, Agent, or Firm*—Sughrue, Mion, Zinn, Macpeak & Seas

[57] ABSTRACT

This bearing comprises an outer ring (11) made from a sleeve (110) which is delimited by an outside wall (111) and an inside wall (112) and which carries on its outside wall (111) a bush (1111), an inner ring (12) which is made from a sleeve (120) which is delimited by an outside wall (121) and an inside wall (122) and which carries on its inside wall (122) a bush (1221), a link (13) located out of plumb with the bushes (1111, 1221) in order to connect these rings (11, 12) while allowing only a relative rotation between them (11, 12).

Application to motor vehicle steering columns.

11 Claims, 2 Drawing Sheets

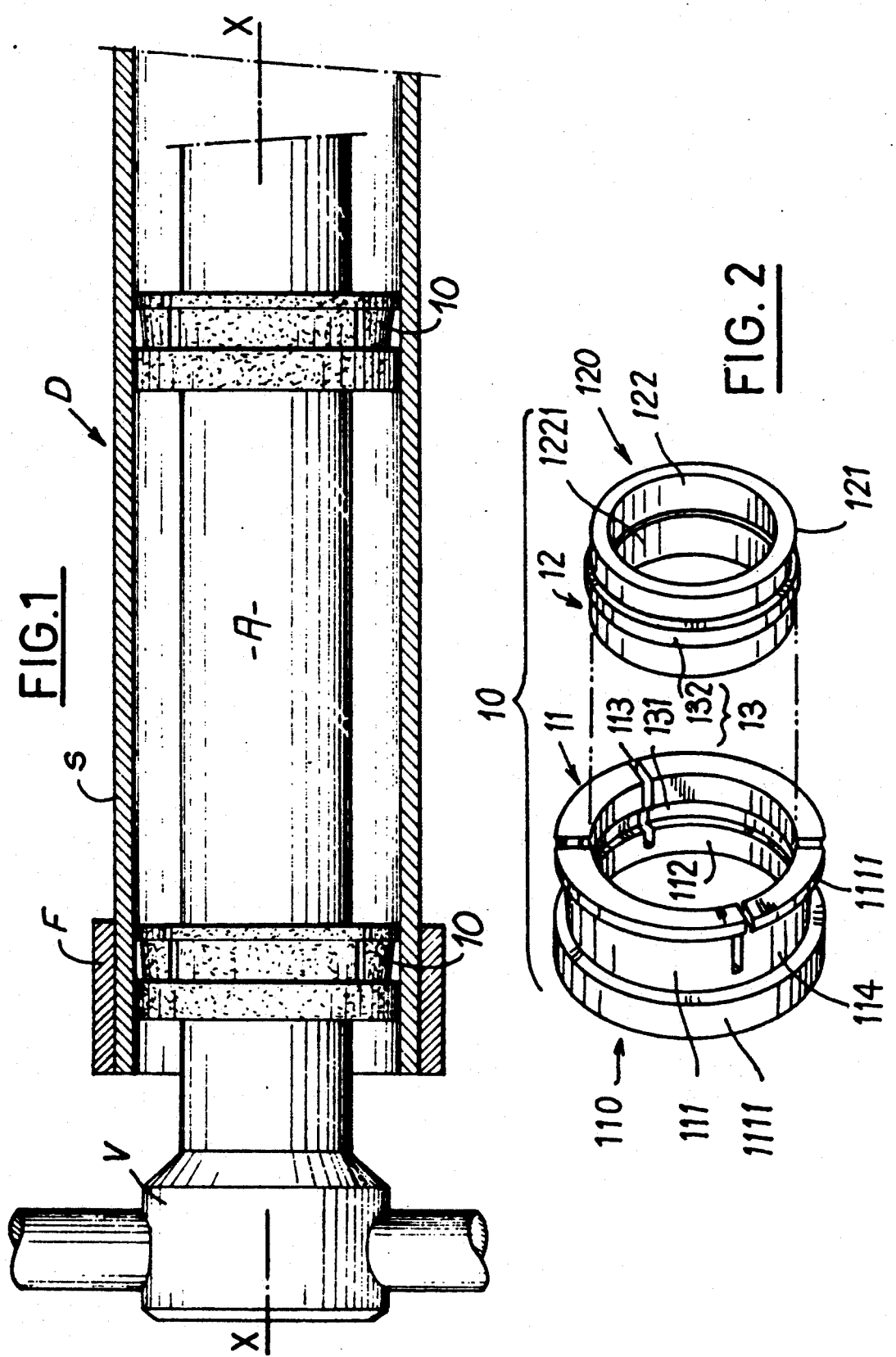

FLEXIBLE PLAIN BEARING AND ITS APPLICATION TO MOTOR VEHICLE STEERING MECHANISMS

The present invention relates to flexible plain bearings intended to provide the link between a shaft and a support in such a way that only one degree of freedom in relative rotation between shaft and support is possible; the invention also relates to the application of such a bearing to motor vehicle steering columns in particular.

In many industrial sectors it is necessary to be able to mount a shaft on at least one support in such a way that this shaft and support can only turn in relative rotation about their common axis without in so doing being able to displace themselves in translation along this axis.

Such a situation is encountered for example in the motor vehicle industry in the assembly of steering columns.

As known, conventionally, a steering column is formed from a support, column holder or tube which is fixed to the driving post of the vehicle by the intermediary of fixings, lugs or similar items. Such a steering column is also formed from an actual shaft which, by the intermediary of the steering wheel, transmits the instructions from the driver to the steering wheels of the vehicle by the intermediary of a steering box and steering gear. This shaft is mounted, at least partially, in this support, holder or tube by means of bearings, most often roller bearings, in order to allow only one degree of freedom of relative rotation about the common axis of the shaft and of this support, holder or tube, to the exclusion of any other degree of freedom such as an axial translation.

Such a subassembly which takes an active part in the safety must be reliable, must satisfy strict and sometimes apparently contradictory standards while remaining of moderate cost.

Such a steering column must for example:

be free of any play without the slightest gripping preventing the displacements, allow a rotation with a torque which does not exceed 0.2 Nm, have a long-time resistance to wear which conventionally corresponds at least to the average estimated service life of the vehicle, withstand the radial compression stresses which can occur during a theft attempt while the anti-theft lock is engaged, under the effect of a torque of 250 Nm, withstand, by means of its stiffness, a bending moment resulting from a radially applied force on the steering wheel in the order of 1 kN/mm, resist any longitudinal translation of the shaft with respect to the support, by sliding.

This brief and non-exhaustive list shows how difficult it is to comply with all of these technical requirements taking account of the financial imperatives which must be considered.

A solution normally used for overcoming this type of difficulty consists in using very special ball or roller bearings, which are very different from the bearings with circular, conical or spherical tracks. In fact, the bearings used for this type of application have, for example, polygonal and often triangular tracks. These bearings allow for the variations in dimensions resulting from manufacturing tolerances between support, tube or holder and shaft to be compensated, while ensuring the total absence of play, as recalled above.

The purpose of the invention is to produce a flexible plain bearing for mounting a shaft on a support in such a way that only one degree of freedom in relative rotation between shaft and support is possible and which, even though having a moderate manufacturing and assembly cost, allows most of the technical requirements which have been mentioned previously to be satisfied.

The subject of the invention is a flexible plain bearing for mounting a shaft on a support in such a way that only one degree of freedom in relative rotation between shaft and support is possible, and which is essentially constituted by an outer ring and an inner ring engaged in the latter. This bearing is notable in that the outer ring is made from a sleeve which is delimited by an outside wall and by an inside wall and which carries on its outside wall in the proximity of at least one of its ends a protruding bush, in that engaged in this outer ring is an inner ring which is made from a sleeve which is delimited by an outside wall and by an inside wall and which carries on its inside wall in the proximity of at least one of its ends a protruding bush, and in that a link is located out of plumb with the bushes in order to connect these rings while allowing only a relative rotation between them, this link being made by a female element carried by one of these facing walls of the rings and a male element carried by the other of these facing walls of the rings, these male and female elements being coupled to each other by mutual engagement.

The subject of the invention is also the application of such a bearing to a motor vehicle steering column.

Other features of the invention will emerge on reading the following description and claims together with an examination of the appended drawing, given solely by way of example, in which:

FIG. 1 is a diagrammatic central cross-section of an embodiment of a flexible plain bearing according to the invention in its application to a steering column;

FIG. 2 is an exploded perspective view of this embodiment of a flexible plain bearing according to the invention; and the other

Figure 3:
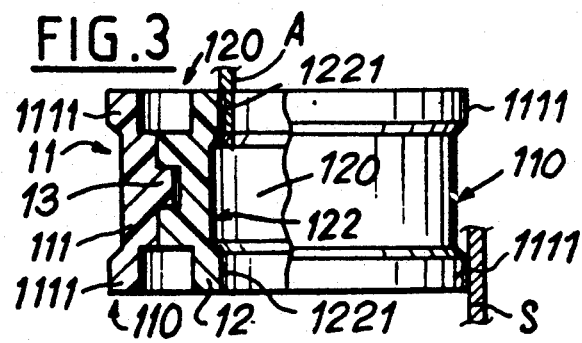
FIGS. 3 to 11 are views in elevation with partial cross-section of other variant embodiments of a flexible plain bearing according to the invention.
Figure 4:
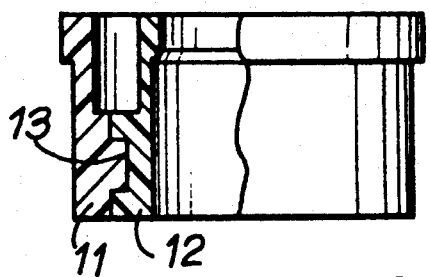
Figure 5:
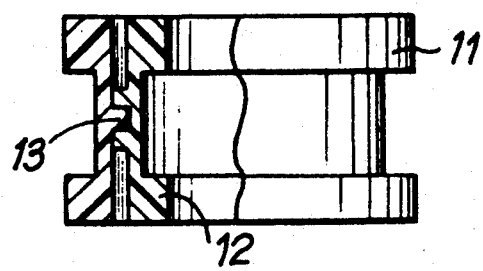

As flexible plain bearings and motor vehicle steering columns are well known in the art, only that which directly or indirectly concerns the invention will be described below. For further information, those skilled in the art in question will refer to the conventional current solutions available to them in order to deal with special problems with which they are facing.

In the following description the same reference number is always used to identify a like component, whatever the embodiment or its variant may be.

For convenience of explanation, each of the components of the invention will first be described before explaining its assembly and operation The features of a flexible plain bearing according to the invention will be described in its particular application to a motor vehicle steering column but it is clear that the plain bearing according to the invention has other applications.

As can be seen in FIG. 1, a motor vehicle steering column D is essentially composed of a support S and a shaft A which are coaxial. The support S which is in the form of a holder or tube is fixed to a structure or shell, which is not shown, of a driving post by means of fixings F or similar items. A steering wheel V, fixed to one of the ends of the shaft A, is intended to rotate it about the common axis X—X, without this shaft being able to slide in translation along this axis in so doing.

In order to achieve this, there is interposed between shaft and support at least one flexible plain bearing according to the invention. As can be seen, this bearing 10 comprises an outer ring 11 in which is engaged, at least partially, an inner ring 12.

As can be seen, the outer ring 11 is made from a sleeve 110 which is delimited by an outside wall 111 and an inside wall 112. In the proximity of at least one of the ends of this sleeve 110, the outside wall 111 carries a protruding bush 1111.

The inner ring 12 is made from a sleeve 120 which is delimited by an outside wall 121 and an inside wall 22. The sleeve 120 carries, in the proximity of at least one of its ends and on its inside wall 122, a protruding bush 1221.

A link 13, located out of plumb with the bushes 1111 and 1221, allows the rings 11 and 12 to be connected in such a way as to prevent any relative translation along the X—X axis but while allowing only a relative rotation between them. This link 13 is made by a female element 131 carried by one of the facing walls 112, 121 of each of the rings 11 and 12, and is also made by a male element 132 carried by the other of these facing walls 112, 121 of the rings 11 and 12. These male and female elements 132 and 131 are coupled to each other by preferably elastic mutual engagement as will be understood below.

Figure 6:
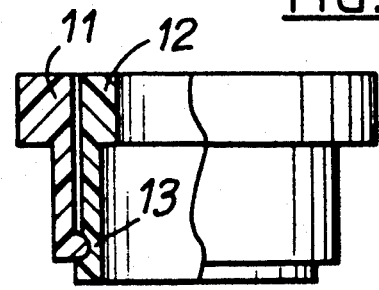
Figure 7:
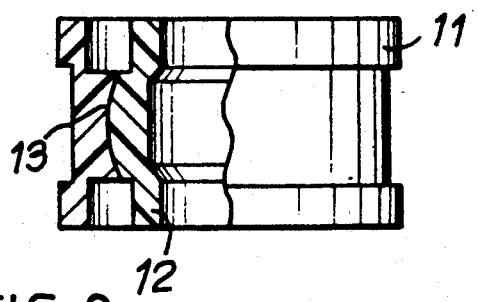
Figure 8:
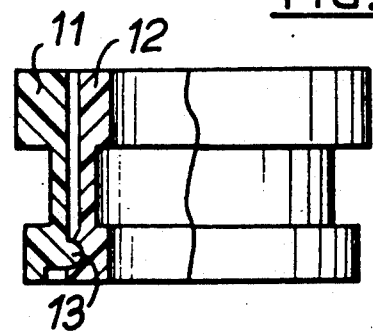
Figure 9:
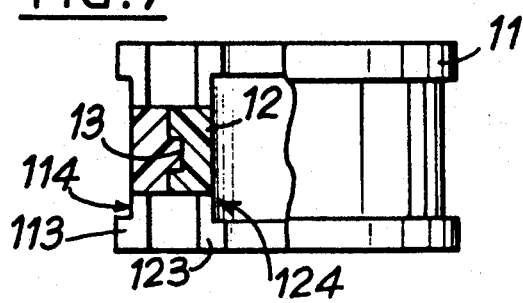
Figure 10:
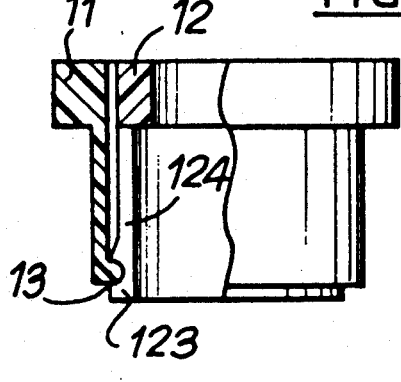
Figure 11:
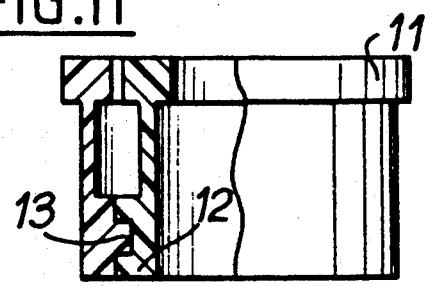

As can be observed in the various figures of the drawing, the central cross-section of the male and female elements 132 and 131 of the link 13 is angular, approximately in Greek key-pattern (FIGS. 3, 4, 5, 9, 11) or curved, preferably as an arc of a circle (FIGS. 6, 8, 10), or spherical (FIG. 7).

If necessary at least one of the sleeves 110, 120 is provided with slots 113, 123 respectively. These slots, which for example emerge at one of the ends of a sleeve, between them delimit tongues 114, 124 respectively. As can be seen, the link 13 and in particular its female 131 and/or male 132 elements are carried at least partly by these tongues 114, 124.

As can be seen, according to the embodiments and the variants embodiments, the male element 132 is carried by the inside wall 112 of the outer ring 11 while the female element 131 is carried by the inside wall 122 of the inner ring 12. It is clear that the opposite solution could be used, that is to say that the male element 132 is carried by the outside wall 121 of the inner ring 12 and the female element 131 is then carried by the inside wall 112 of the outer ring 11, as shown in FIG. 7.

The outer 11 and inner 12 rings of the bearing 10 according to the invention are assembled and mounted as shown in particular in FIG. 1; as can be understood the bush 1221 protruding from the inside wall 122 of the sleeve 120 of the inner ring 12 provides the grip on the shaft 1. Similarly, the bush 1111 protruding from the outside wall 111 of the sleeve 110 of the outer ring 11 provides the grip on the support S, as shown in FIG. 1.

Because of the position adopted for the male and female elements 132 and 131 respectively of the link 13 out of plumb with the bushes 1111 and 1221, it is observed that the guidance in rotation is absolutely independent of the forces and reactions which develop at the level of the bushes.

Owing to this solution, a flexible plain bearing is obtained which has a high degree of guidance in rotation, which practically prohibits any longitudinal sliding because of the large forces developed at the level of the bushes, and great radial stiffness.

The choice of the elasticity of the materials from which the rings are made, and the possible presence of slots which delimit tongues in them, allow a greater flexibility to be obtained which favours assembly and/or functioning.

Preferably, at least one of the rings 11 and 12 is made from a synthetic material and when two synthetic materials are used the pair of these materials chosen is that which offers the desired flexibility, coefficient of friction and lack of tendency to creep, endurance, resistance to wear etc.

Among the materials which can be used, polyacetals, polypropylenes, polyamides and polyethylene glycol terephthalates will be mentioned in particular.

If necessary, these materials are "loaded" with at least one lubricating substance chosen for example from graphite, molybdenum disulphide, polytetrafluoroethylene and silicones in particular.

The rings of a bearing according to the invention are manufactured for example by injection moulding.

As can be understood, the assembly of the two rings of a bearing according to the invention is preferably carried out previously by mutual elastic fitting before they are used; if necessary each of these rings can first be positioned on the shaft and the support respectively and these rings are then connected.

It will be observed that what is essential is the absence of play and the very strong longitudinal holding of each of the rings on the shaft and in the support respectively.

All the attraction and the advantages provided by a flexible plain bearing according to the invention can be understood immediately from the above description.

I claim:

1. Flexible plain bearing for mounting a shaft on a support coaxially in such a way that only one degree of freedom in relative rotation between shaft and support is possible, this bearing (10) being characterised in that it comprises an outer ring (11) made from a sleeve (110) which is delimited by an outside wall (111) and an inside wall (112) and which carries on its outside wall (111) in the proximity of at least one of its ends a protruding bush (1111), engaged in this outer ring (11) an inner ring (12) which is made from a sleeve (120) which is delimited by an outside wall (121) and an inside wall (122) and which carries on its inside wall (122) in the proximity of at least one of its ends a protruding bush (1221), a link (13) located out of plumb with the bushes (1111, 1221) in order to connect these rings (11, 12) while allowing only a relative rotation between them (11, 12), made by a female element (131) carried by one of these facing walls (112, 121) of the rings (11, 12) and made by a male element (132) carried by the other of these facing walls (112, 121) of the rings (11, 12), these male and female elements (132, 121) being coupled to each other by mutual engagement.

2. Bearing according to claim 1, characterised in that the cross-section of these male and female elements (132, 131) is angular, particularly in Greek key-pattern.

3. Bearing according to claim 1, characterised in that the cross-section of these male and female elements (132, 131) is curved, preferably as an arc of a circle.

4. Bearing according to claim 1, characterised in that the cross-section of these male and female elements (132, 131) is spherical.

5. Bearing according to any one of claims 1 to 4, characterised in that at least one of the sleeves (110, 120) is provided with slots (113, 123) which between them delimit tongues (114, 124) and in that this link (13) is at least partly carried by these tongues (114, 124).

6. Bearing according to claim 1, characterised in that the male element (132) is carried by the inside wall (112) of the outer ring (11) and the female element (131) is carried by the inside wall (122) of the inner ring (12).

7. Bearing according claim 1, characterised in that the male element (132) is carried by the outside wall (121) of the inner ring (12) and the female element (131) is carried by the inside wall (112) of the outer ring (11).

8. Bearing according to claim 1, characterised in that the rings (11, 12) are each made from a synthetic material and in that the pair of these synthetic materials in particular provides flexibility, a small coefficient of friction and lack of tendency to creep, endurance and resistance to wear.

9. Bearing according to claim 8, characterised in that the materials are chosen in particular from polyacetals, polypropylenes, polyamides and polyethylene glycol terephthalates.

10. Bearing according to claim 9, characterised in that the materials are loaded with at least one lubricating substance chosen from graphite, molybdenum disulphide, polytetrafluoroethylene and silicones in particular.

11. Application of a bearing according to claim 1 to a land motor vehicle steering column.

* * * * *